(12) United States Patent
Hernandez Ferre et al.

(10) Patent No.: US 11,942,839 B2
(45) Date of Patent: Mar. 26, 2024

(54) METHOD FOR REMOVING ACTIVE STATOR PARTS

(71) Applicant: General Electric Renovables Espana, S.L., Barcelona (ES)

(72) Inventors: Alejandro Hernandez Ferre, Barcelona (ES); Pablo Pozo Torres, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/826,665

(22) Filed: May 27, 2022

(65) Prior Publication Data
US 2022/0385154 A1 Dec. 1, 2022

(30) Foreign Application Priority Data

May 31, 2021 (EP) ..................................... 21382484

(51) Int. Cl.
*H02K 15/03* (2006.01)
(52) U.S. Cl.
CPC ........ *H02K 15/03* (2013.01); *Y10T 29/49009* (2015.01)
(58) Field of Classification Search
CPC ............ F03D 80/50; F03D 13/00; F03D 9/25; H02K 1/148; H02K 15/0006; H02K 2213/12; H02K 7/1838; H02K 15/02; H02K 15/03; H02K 21/24; Y10T 29/49009; Y10T 29/49318; Y10T 29/4973
USPC ............ 29/596, 598, 602.1, 603.2, 729, 732
See application file for complete search history.

(56) References Cited

U.S. PATENT DOCUMENTS

| | | | |
|---|---|---|---|
| 6,781,276 B1 | 8/2004 | Stiesdal et al. | |
| 9,281,731 B2* | 3/2016 | Benedict | H02K 7/1838 |
| 9,359,994 B2* | 6/2016 | Bywaters | F03D 80/50 |
| 2012/0073117 A1 | 3/2012 | Benedict | |
| 2012/0073118 A1 | 3/2012 | Bywaters et al. | |

FOREIGN PATENT DOCUMENTS

EP 2273652 A1 1/2011

OTHER PUBLICATIONS

European Search Report Corresponding to EP21382484 dated Nov. 24, 2021.

* cited by examiner

*Primary Examiner* — Thiem D Phan
(74) *Attorney, Agent, or Firm* — Dority & Manning, P.A.

(57) ABSTRACT

The present disclosure relates to methods and tools for mounting and/or removing active parts of a stator of an electrical machine, e.g. a generator. The present disclosure also relates to rotors, stators and generators. A method comprises removing one or more active rotor parts of a rotor of an electrical machine when the rotor is in a removal starting position, arranging a replacement tool in a gap left by the removed active rotor parts, rotating the rotor to an alignment position such that the replacement tool is radially aligned with an active stator part to be removed, picking the active stator part to be removed with the replacement tool, rotating the rotor to an extraction position, and removing the active stator part from the rotor.

8 Claims, 8 Drawing Sheets

METHOD FOR REMOVING ACTIVE STATOR PARTS

The present disclosure relates to methods and tools for mounting and/or removing active parts of a stator of an electrical machine, for example one or more active parts of a stator of a generator of a direct drive wind turbine. The present disclosure also relates to rotors, stators and generators of electrical machines.

BACKGROUND

Electrical machines, such as motors and generators, generally comprise a rotor structure and a stator structure. Large electrical generators may be e.g. permanent magnet excited generators (PMG). The rotor of an electrical machine rotates with respect to the stator. The rotor may be the inner structure and the stator the outer structure. The stator in this case thus surrounds, e.g. radially, the rotor. Alternatively, the configuration may be the opposite, i.e. the rotor surrounds, e.g. radially, the stator.

Such generators may be used for example in wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators may also be coupled to a gearbox which increases the rotational speed of the generator to for example between 50 to 500 rpm or even more.

In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies. This is an important reason why permanent magnet generator are employed in offshore wind turbines, and particularly in direct drive offshore wind turbines.

Multiple permanent magnets may be provided in a permanent magnet module, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor structure such as a rotor rim in such a way that the plurality of magnets is fixed together to the rotor rim through the module base. The use of permanent magnet modules may facilitate the manufacturing of a rotor. Similarly, stator coils may be grouped together in coil modules. Coil modules may be fixed to a generator structure such as a stator rim.

In large electrical machines, such as permanent magnet generators of direct drive wind turbines, it may be difficult to access a damaged coil in the stator. For example, if the coil to be replaced is close to the wind turbine tower or to a front (upwind) side of the nacelle, the damaged coil could hit the tower or the nacelle when taking it out. Likewise, if a replacement coil is to be arranged in a stator gap which is difficult to access, installing the coil may require a considerable amount of time and effort.

An easier way to replace a damaged coil in the stator could be, from a suitable position, taking out a number of coils until the damaged coil is reached. Then, from that suitable position, a new coil could be installed and the previously removed working coils could be mounted again. Installing and removing coils from a suitable position may comprise inserting and extracting the coils from a top or an upper (radial) portion of the generator. However, this may still need a significant amount of time.

SUMMARY

In an aspect of the present disclosure, a method for removing an active stator part of an electrical machine is provided. The method comprises removing one or more active rotor parts of a rotor or an electrical machine when the rotor is in a removal starting position and arranging a replacement tool in a gap created by the removing of the active rotor parts. The method further comprises rotating the rotor to an alignment position such that the replacement tool is radially aligned with an active stator part to be removed and picking the active stator part to be removed with the replacement tool. The method further comprises rotating the rotor to an extraction position and removing the active stator part from the rotor.

According to this aspect, a replacement tool may be releasably attached to a rotor and carried to a circumferential position in which a damaged active part of the stator is placed. The damaged active part may be in a position which is particularly difficult to access or from which removing the part is particularly complicated. Once picked by the tool, the damaged part may be removed from a position which may be relatively easy to access.

In this way, replacement of an active part of the stator may be efficiently performed. The integrity of the part may not be comprised, and also the operators may replace an active stator part in a safer way.

In a further aspect, a method for mounting an active stator part in an electrical machine is provided. The method comprises arranging an active stator part in a replacement tool attached to a rotor while the rotor is in a mounting starting position. The method further comprises rotating the rotor to an insertion position in which the replacement tool is radially aligned with a gap of the stator in which the active stator part is to be mounted. The method further comprises inserting the active stator part in the gap.

This method may be performed after the extraction method above, or may be performed independently from the extraction method.

In yet a further aspect, a replacement tool is provided. The replacement tool comprises a holding portion configured to hold an active stator part. The replacement tool further comprises an anchoring portion configured to secure the replacement tool to a rotor.

The replacement tool may be used in any of the above methods, including the combination of both methods.

In a further aspect, a stator is provided. The stator comprises a stator frame, a stator rim and a plurality of active stator parts attached to the stator rim. The stator frame comprises one or more recesses comprising one or more movable elements. A movable element is configured to push an active stator part away from the stator frame. For example, a coil, coil assembly or coil module may be pushed in a radial direction towards a rotor by a movable element stored within a recess. A stator may be a stator for a direct drive wind turbine. A stator may be configured to be radially surrounded by a rotor.

In yet a further aspect, a stator is provided. The stator comprises a stator frame, a stator rim and a plurality of active stator parts attached to the stator rim. The stator frame comprises one or more protrusions comprising one or more movable elements. A movable element is configured to push an active stator part away from the stator frame. For example, a coil may be pushed in a radial direction towards a rotor by a movable element stored within a protrusion. A stator may be a stator for a direct drive wind turbine. A stator may be configured to be radially surrounded by a rotor. An active stator part may be a coil, a coil assembly or a coil module in some examples.

In a further aspect, a rotor is provided. The rotor comprises a rotor rim and a plurality of removable rotor elements attached to the rotor rim. In use, the rotor elements face a stator. A height of the rotor elements is substantially equal to or greater than a height of the active stator parts such that one or more of the active stator parts can be rotated with the rotor when held by the rotor. A height may be measured along a radial direction. A rotor may be a rotor for a direct drive wind turbine. A rotor may be configured to radially surround a stator. The rotor elements may be active rotor parts. The rotor elements may be an assembly of an active rotor part and a spacer. An active rotor part may be a permanent magnet module in some examples.

In this aspect, a height of a rotor element may be such that a tool configured to hold an active stator part can be arranged in the rotor, e.g. in a rotor gap after removing one or more rotor elements, for extracting and/or inserting an active stator part by rotating the rotor.

Still in a further aspect, an electrical machine is provided. The electrical machine comprises a rotor, a stator and a radial air gap between the rotor and the stator. The stator comprises a plurality of active stator parts. The rotor comprises a rotor rim, a plurality of rotor elements removably attached to the rotor rim. A height of the rotor elements is substantially equal to or greater than a height of the active stator parts such that one or more of the active stator parts can be rotated with the rotor when held by the rotor. The active rotor parts may be permanent magnet modules in some examples. The active stator parts may be coils in some examples.

Herein, a height is measured in a radial direction. An electrical machine may be a generator, in particular a generator for a wind turbine, and more in particular a generator for a direct drive wind turbine. The rotor may surround the stator in some examples.

DETAILED DESCRIPTION OF EXAMPLES

Figure 1:
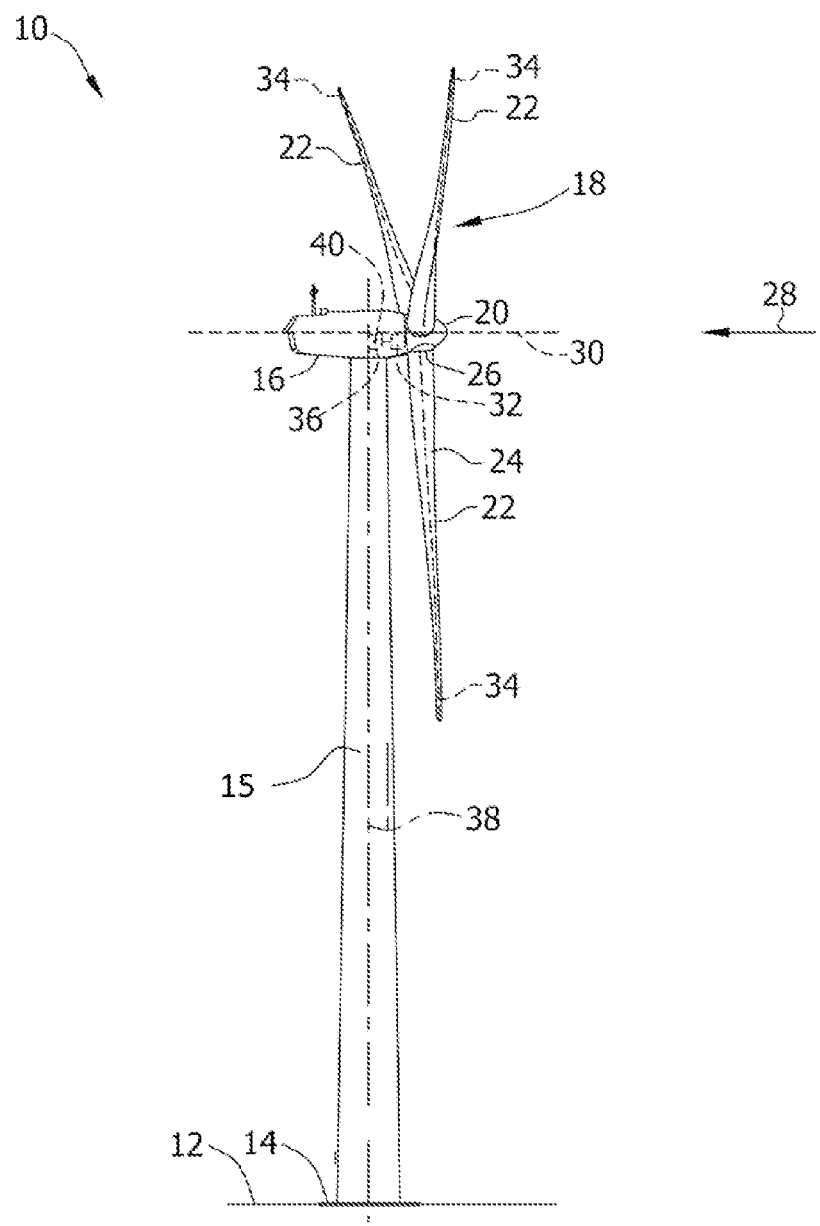
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
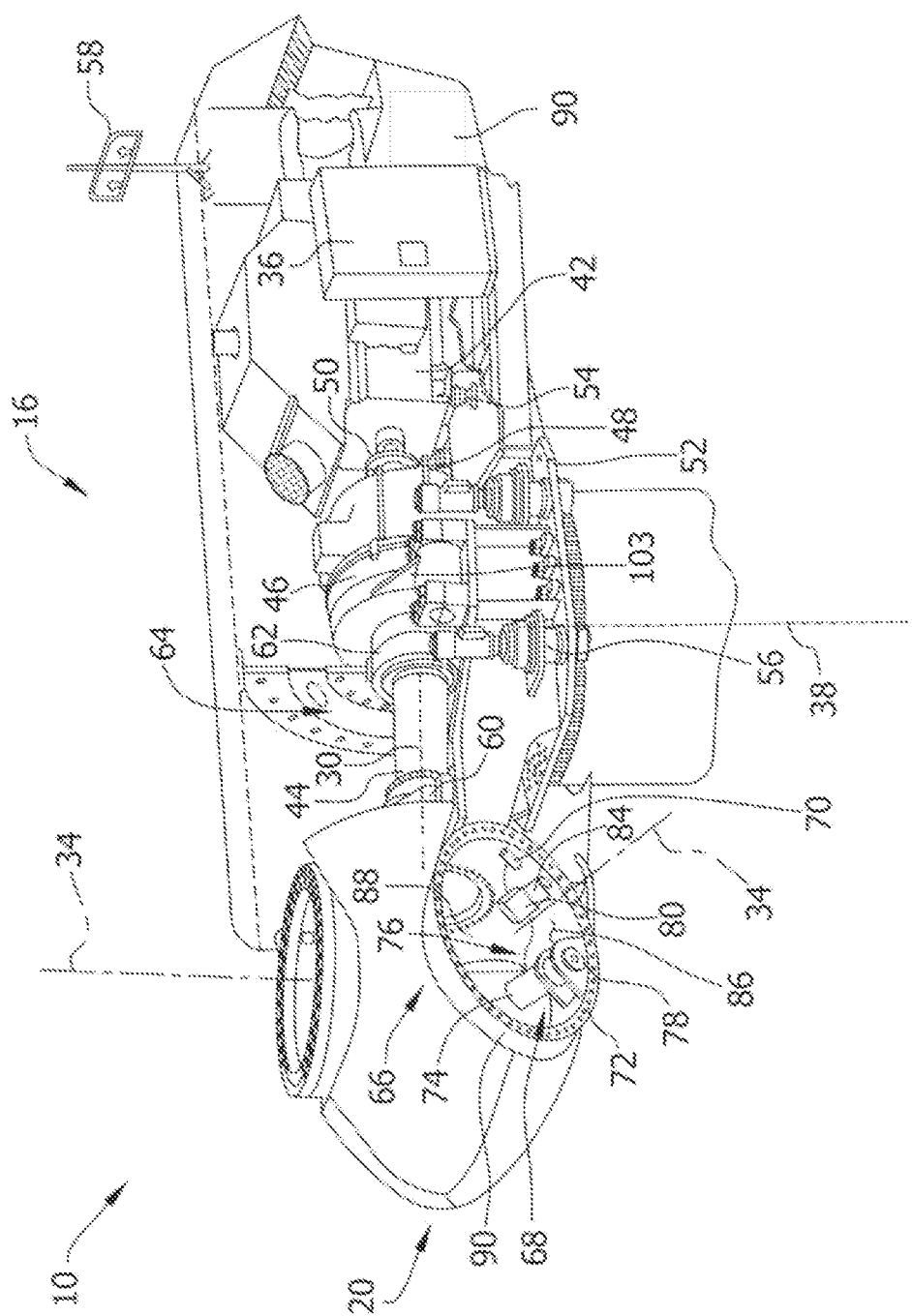
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400 V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
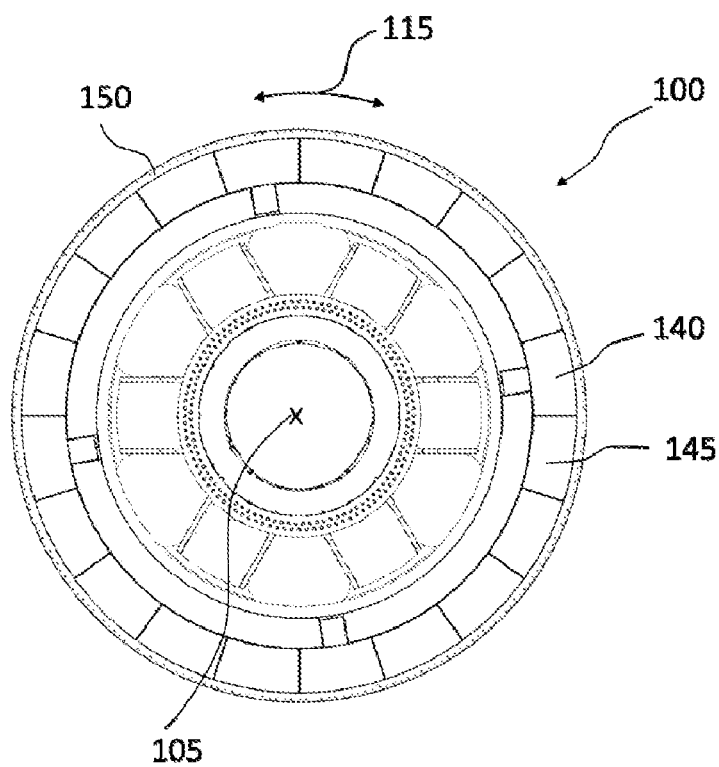
FIG. 3 schematically illustrates a rear view of an example of an electrical machine. The electrical machine may be a generator for a direct drive wind turbine.
Figure 4:
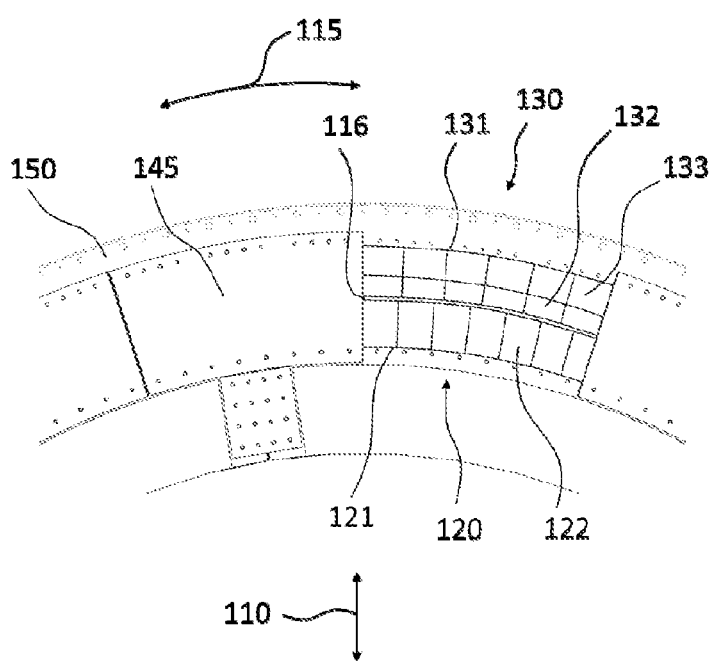
FIG. 4 schematically illustrates a detail of the electrical machine of FIG. 3 with a removed segment.

FIG. 3 schematically illustrates a rear view of an example of an electrical machine 100. FIG. 4 schematically illustrates a portion of the electrical machine of FIG. 3 without a segment 145. As it can be seen in the examples of FIGS. 3 and 4, an electrical machine 100 comprises a rotor 130, a stator 120 and a radial air gap 116 between the rotor 130 and the stator 120.

In this example, the electrical machine is a generator for a wind turbine, in particular for a direct drive wind turbine. The illustrated back side of the generator may face a downwind side of the wind turbine and not the rotor of the wind turbine. In other examples, the electrical machine 100 may be a generator for a wind turbine with a gearbox, a generator in general or even a motor.

In the example of FIGS. 3 and 4, the generator comprises an annular cover 140 in its back side (the wind turbine rotor being arranged at a front side of the generator). The annular cover 140 comprises a plurality of segments 145, one of which has been removed in FIG. 4. In this figure, a rotor rim 131 and a stator rim 121 may be seen. In the illustrated example, the rotor 130 radially surrounds the stator 120. In other examples, the stator may radially surround the rotor.

The stator 120 comprises a stator rim 121 and a plurality of active stator parts 122. The rotor 130 comprises a rotor rim 131 and a plurality of active rotor parts 132. An active stator part 122 may be one or more permanent magnets, one or more permanent magnet modules, one or more coils, or one or more coil modules. An active rotor part 132 may likewise be one or more permanent magnets, one or more permanent magnet modules or one or more coils, or one or more coil modules. For example, an active stator part 122 may be a coil, and an active rotor part 132 may be a permanent magnet module. In other examples, both the active stator parts 122 and the active rotor parts 132 may be coils. A radial air gap 116 separates the active parts 132 of the rotor from the active parts 122 of the stator. Referring to a coil may include referring to just a coil or to a coil and a coil support, e.g. a coil tooth.

As illustrated in FIGS. 3 and 4, an annular cover 140 may be attached to a flange 150 of a circumferential cover of the rotor 130. The annular cover 140 may extend in a radial plane substantially perpendicular to an axial direction 105, and the circumferential cover (not shown) may radially surround the stator. A flange 150 may be understood as a side portion of the circumferential cover of the rotor. Removable fasteners such as bolts or screws may join the annular cover 140 to the flange 150. An axial gap may be provided between the annular cover 140 and the active parts of the stator 122 and rotor 132.

The annular cover 140 may comprise a plurality of segments 145. As it can be seen in the example of FIG. 4, removal of a segment 145 may enable access to some active parts of the rotor and/or the stator. The annular cover 140 may protect the active parts of the rotor and/or the stator. In other examples, such a cover 140 may not be present.

Figure 5:
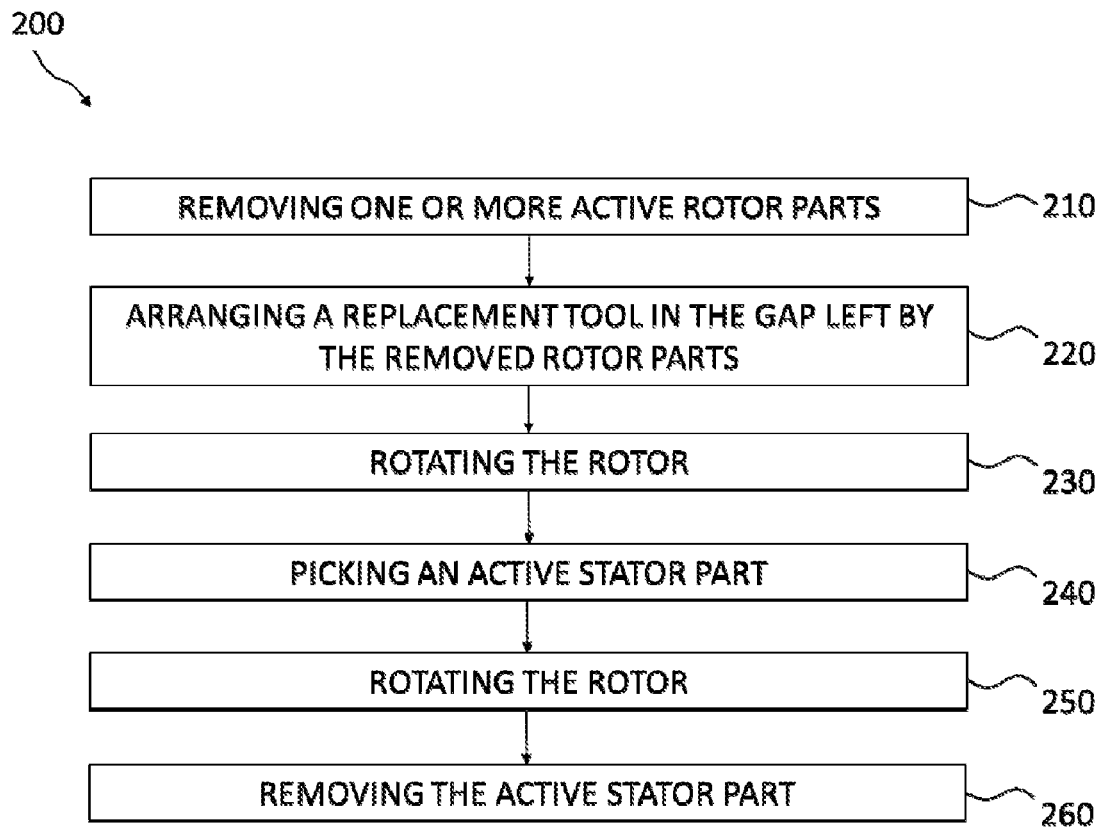
FIG. 5 schematically illustrates a flowchart of an example of a method for removing an active part of a stator.

In an aspect of the disclosure, a method 200 is provided. Method 200 is suitable for removing an active part 122 of a stator 120 of an electrical machine 100. Method 200 is schematically illustrated in FIG. 5.

In some examples, the electrical machine may be a generator, in particular a generator for a wind turbine, and more in particular a generator for a direct drive wind turbine.

Active parts, as used throughout the present disclosure, may be regarded as parts of the rotor or stator that are magnetically and/or electrically active. In some examples, the plurality of active stator parts 122 may be a plurality of coils, and the plurality of active rotor parts 132 may be a plurality of permanent magnet modules. An active part to be removed 122 may be a coil. A tooth supporting a coil may be removed together with the coil.

The method comprises, at block 210, removing one or more active rotor parts 132 of a rotor 130 of an electrical machine 100 when the rotor is in a removal starting position. If one or more active parts 132 are removed, e.g. one or more permanent magnet modules, the parts may be adjacent to one another in a circumferential direction 115. This can be seen in FIG. 6, where two adjacent active parts of the rotor 132 have been removed. The removed part(s) 132 leave a gap 160 in the rotor.

The removal starting position of the rotor may be selected according to its suitability for the removal of the active part(s) of the rotor 132. For example, the rotor 130 may be rotated to a first position such that the one or more active parts of the rotor 132 to be removed are easily accessible. Relatively easy access may for instance be from an upper or a top portion of the nacelle. If the rotor is already in a suitable position, rotating it would not be necessary.

The method may further comprise removing a side cover, e.g. a portion of side cover 140, to enable access to the active rotor parts 132. A side cover may in some examples be a segment 145 of an annular cover 140. Removing a side cover 145 may create an opening which enables removal of one or more active parts of the rotor 132 (and/or of the stator 122) in an axial direction 105.

Additionally or alternatively, the method may comprise removing a portion of a circumferential cover (not shown) to enable access to the active rotor parts 132. A circumferential cover may cover the rotor 130 along an axial direction 105 and a tangential or circumferential direction 115. Flange 150 may be an extension of the circumferential cover over the rear side (downstream side) of a generator. Removing a portion of a circumferential cover may allow removal of one or more active rotor parts 132 in a radial direction 110 as well as in an axial direction 105. One or more active stator parts 122 may similarly be removed.

In some examples, the rotor 130 may comprise a plurality of spacers 133. The spacers 133 may be arranged in a circumferential direction 115 between a rotor rim or a circumferential cover of the rotor and the plurality of active parts of the rotor 132. Spacers 133 may be attached to a rotor rim 131 and active parts of the rotor 132 may be attached, e.g. radially, to the spacers 133. A spacer 133 may have a width in a circumferential direction 115 which is substantially equal to a width of an active part of the rotor 132 in a circumferential direction 115, as illustrated for example in FIG. 4. Likewise, a spacer 133 may have a length in an axial direction 105 which is substantially equal to a length of an active part of the rotor 132 in an axial direction 105. A height of a spacer 133 in a radial direction 110 may be less than, substantially equal to or more than a height of an active rotor part 132 in a radial direction 110. In FIG. 4, a height of a spacer 133 in a radial direction 110 is bigger than that of an active part of the rotor 132.

If spacers 133 are present in the rotor 130, removing the active rotor parts 132 may further comprise removing one or more spacers radially 110 adjacent to the active rotor parts 132. Therefore, for example, once the rotor 130 is in a first position, one or more spacers 133 and one or more active parts of the rotor 132 may be taken out.

Figure 6:
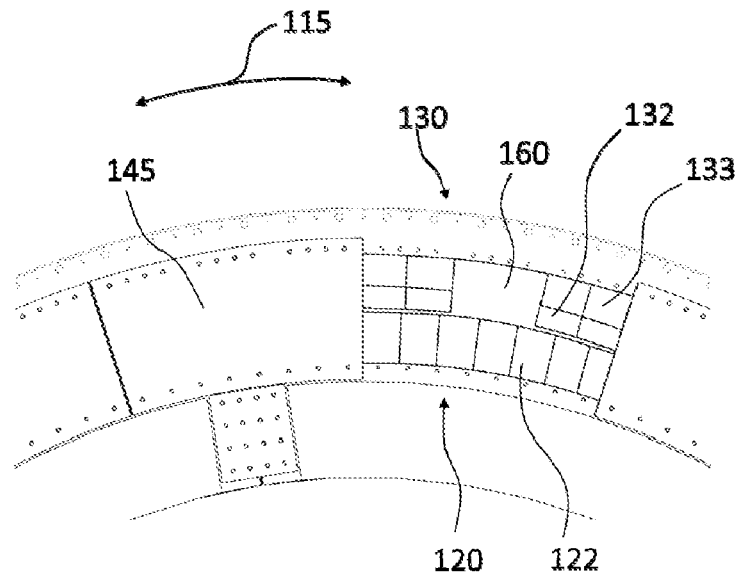
FIGS. 6-8 schematically illustrate some aspects of the method of FIG. 5.

The one or more spacers 133 and the one or more active parts of the rotor 132 may be removed together, i.e. in a single operation, or may be removed separately. For example, one or more spacers 133 may be removed first and one or more active parts 132 may be removed afterwards. Removal may be performed axially 105 and/or radially 110. In FIG. 6, removal may have been performed axially 105 through the opening left by the previously detached segment 145.

The method further comprises, at block 220, arranging a replacement tool 101 in a gap 160 left by the removed active rotor parts 132. If spacers 133 have also been removed, the replacement tool may be accommodated in the gap 160 left by the removed spacers 133 and active parts 132. The replacement tool 101 is configured to hold an active stator part 122, e.g. a coil, or a coil and a coil tooth.

The use of spacers 133 and, when used, their height (dimension in radial direction 110), may be chosen depending on the heights (dimensions in radial direction 110) of the active parts of the stator 122 and the rotor 132. For example, if the height of an active rotor part 132 is less than the height of an active stator part 122, more room for arranging the replacement tool 101 may be required and therefore spacers may be used. The diameter of the rotor may also be increased in some examples for creating more space in a radial direction 110 for arranging the spacers 133 and the replacement tool 101.

Alternatively or in addition to the use of spacers, the height (dimension in radial direction 110) of the active rotor parts 132 may be increased. For example, a height of a permanent magnet module, and in particular a height of its base (i.e. the part configured to be attached to a rotor rim 131, or to a spacer), may be increased. A diameter of the rotor may again also be increased in some examples. By using one or more of the previous options, one or more extracting tools 101 may have enough free space in a radial direction for being arranged for extracting a active rotor part 122.

In view of the above, a rotor 130 comprising a rotor rim 131 and a plurality of removable rotor elements attached to the rotor rim 131 can be provided. In use, the rotor elements face a stator. A height of the rotor elements is substantially equal to or greater than a height of the active stator parts 122 such that one or more of the active stator parts 122 can be rotated with the rotor 130 when held by the rotor. A height may be measured along a radial direction 110.

In this way, enough space can be provided in the rotor 130, particularly in a radial direction 110, for arranging a tool 101 as described throughout this disclosure.

In some examples, the rotor elements are active rotor parts 132, for example permanent magnet modules.

In some other examples, the rotor elements comprise an assembly of an active rotor part and a spacer. For example, the rotor elements may be active rotor parts 132 attached to spacers 133, such that the active parts are attached to the rotor rim by the spacers.

Such a rotor may be included in an electrical machine, for example in a generator. The rotor and the generator may be suitable for a wind turbine, and in particular for a direct drive wind turbine.

Figure 7:
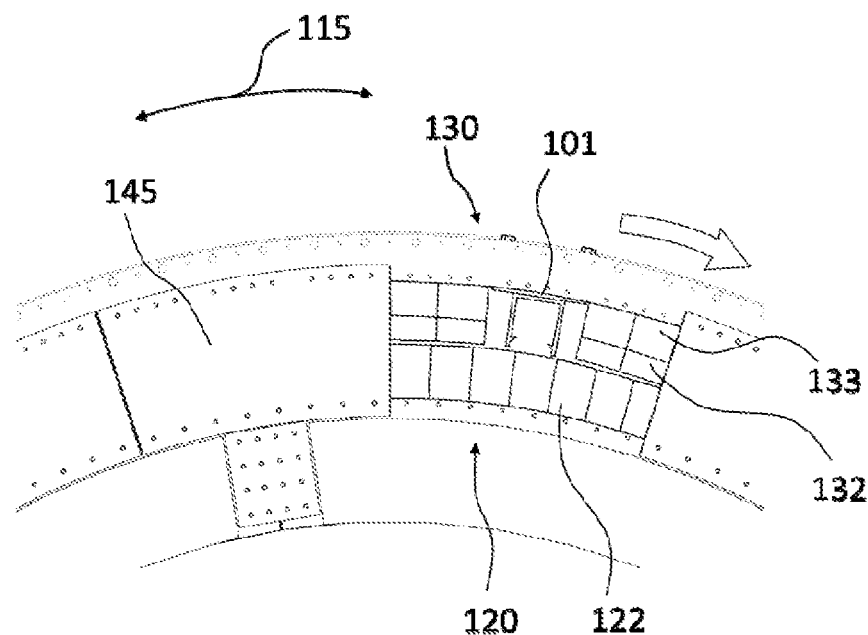

The replacement tool 101 may be axially introduced into the gap 160. The tool 101 may alternatively be radially introduced into the gap 160. Once in a desired position, e.g. in a desired axial position, the replacement tool 101 may be secured. For example, the tool 101 may be releasably attached, e.g. through nuts and bolts, to a rotor rim. A tool 101 may also clamp a portion of the rotor, e.g. a rotor rim. A replacement tool 101 attached to a rim and rotor cover may be seen in FIG. 7. In this example, the rotor cover is directly fixed to the rotor rim and may form an integral part therewith, i.e. the rotor cover rotates with the rotor rim. More than one replacement tool 101 may be arranged in the gap 160 and secured to the rotor 130, in particular along an axial direction 105. For example, two replacement tools 101 may be arranged in the gap 160 axially such that the longitudinal ends of a active stator part 122 may be grasped by the replacement tools 101 later on.

The method further comprises, at block 230, rotating the rotor to an alignment position such that the replacement tool 101 is radially aligned with an active stator part 122 to be removed. The active stator part 122 to be removed may be a coil in some examples. An active part 122 may be in a circumferential position of the stator 120 which is difficult to access, i.e. an active part of the stator 122 may be difficult to extract from that position. For example, in the case of a direct driven generator of a wind turbine, the active stator part 122 may be close to the tower or to a wind turbine blade. If removed directly from such positions, an active part 122 may collide with the tower or a blade.

Figure 8:
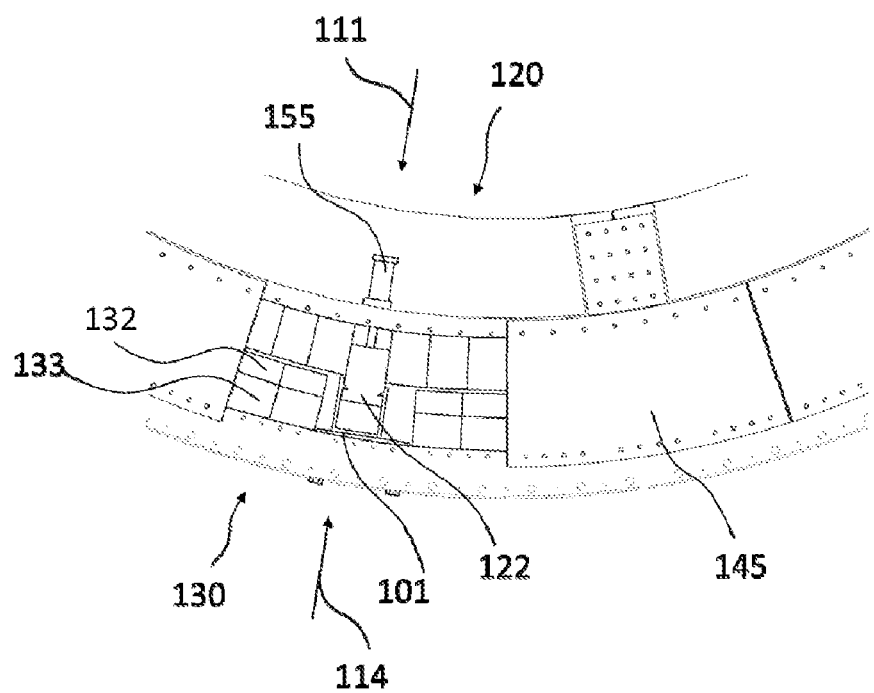

The method further comprises, at block 240, picking the active stator part 122 to be removed with the replacement tool 101. The method may further comprise pushing the active stator part 122 to be extracted towards the replacement tool 101 by a movable element 155. The movable element 155 may be configured to such end. The movable element 155 may move an active part 122 in a radially outwards direction 111. The movable element 155 may advance in a radially outwards direction 111 to this end. A movable element 155 pushing a active stator part 122 towards a tool 101 may be seen in FIG. 8.

The active stator part 122 may need to be detached from the stator rim 121 first. For example, one or more bolts joining the active part 122 to the stator rim 121 may need to be removed before using the movable element 155 to displace the active part 122 radially outwards 111.

Figure 9A:
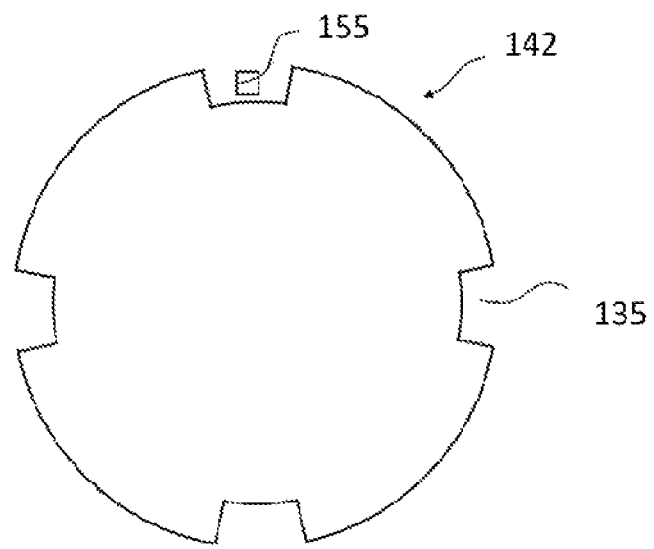
FIGS. 9A and 9B schematically illustrate two examples of a stator.
Figure 9B:
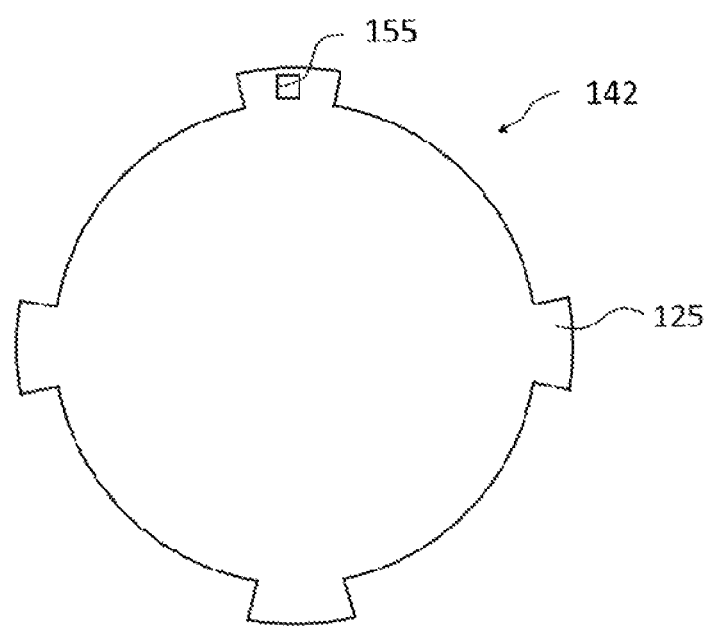

A movable element 155 may be already incorporated in the stator 120, e.g. in a recess 135 (see FIG. 9A) or a protrusion 125 (see FIG. 9B) of the stator. For example, if it is known that certain circumferential regions of the stator 120 may be problematic for replacing active parts 122 attached therein, one or more pushing elements 155 may be arranged with these parts of the stator. Protrusions and/or recesses may be provided in a stator frame 142.

In some examples, the stator 120 may comprise one or more recesses 135 in which one or more pushing elements 155 may be stored. A recess may extend partially or totally along an axial length of the stator. In the first case, there may be more than one recess along an axial direction 105. For example, two recesses may be provided along an axial direction at two different axial positions. A pushing element 155 may be stored in each recess.

Similarly, one or more recesses 135 may be provided along a circumferential direction 115. For example, three or four recesses substantially equally spaced along a circumferential direction may be provided in the stator 120. Each of the recesses may extend along a total or a partial axial length of the stator. One or more pushing elements 155 may be arranged at a certain axial position in each recess.

In some other examples, the stator 120 may comprise one or more protrusions 125 in which one or more pushing elements 155 may be stored. A protrusion 125 may extend partially or totally along an axial length of the stator. In the first case, there may be more than one protrusion along an axial direction 105. For example, two protrusions may be provided along an axial direction at two different axial positions. A pushing element 155 may be stored inside or below each protrusion.

Similarly, one or more protrusions 125 may be provided along a circumferential direction 115. For example, three or four protrusions substantially equally spaced along a circumferential direction may be provided in the stator 120. Each of the protrusions may extend along a partial or a total axial length of the stator. One or more pushing elements 155 may be arranged at a certain axial position in each protrusion.

The dimensions of a recess 135 or a protrusion 125 may be selected depending on the dimensions of a pushing element 155. A circumferential spacing between circumferentially adjacent protrusions or recesses may be substantially the same along a circumferential direction 115. This may be important for appropriate load distribution in the stator.

A movable element 155 may be fixedly or releasably connected to a protrusion or recess. A movable element 155 may be retractable. In some examples, a movable element 155 may be a rod, a screw, e.g. a worm screw, or any suitable element or tool which may be able to push an active stator part 122 away from the stator rim 121.

In some examples, the replacement tool 101 may not move radially 110 to pick the active stator part 122. The tool may not be configured to move in a radial direction 110. The movable element 155 may push the active part towards the replacement tool 101 and the tool 101 may grasp the active part 122. The replacement tool may have for example clamps or a clamping portion for this. The active stator part 122 may be clamped by the tool. For example, the tool may clamp two opposite circumferential recesses of the part 122 with the tool 101. In some other examples, the replacement tool 101, e.g. a portion of the tool, may move radially (inwards, see arrow 114 in FIG. 8) in order to pick the active part 122. In these examples, the tool 101 is configured to move radially.

The method further comprises, at block 250, rotating the rotor 130 to an extraction position, and at block 260, removing the active stator part 122 from the rotor 130. The active part 122 may be removed in an axial direction 105 in some examples. The replacement tool 101 may be then detached, or it may be left mounted for mounting a new active stator part 122. The extraction position may be the removal starting position in some examples. In other examples, the extraction position may be different from the removal starting position.

With this method, other active parts, for example other active stator parts 122, do not need to be extracted to reach a damaged active part 122. Rather, a replacement tool 101 is moved from a first removal starting position to a second alignment position where the damaged active part 122 is, and then moved to an extraction position, e.g. the first position. This method may accordingly be easier to perform and more efficient than other methods for removing or replacing active stator parts 122 in locations difficult to access or maneuver.

A new active stator part 122 may be joined to the replacement tool 101 and the above steps may be performed in a reverse order to install it. These steps are indicated below. They may be performed after block 260 of method 200 or they may be performed independently. They are indicated as a separate method 300 below, but together with removal method 200, a replacement method may be performed.

Figure 10:
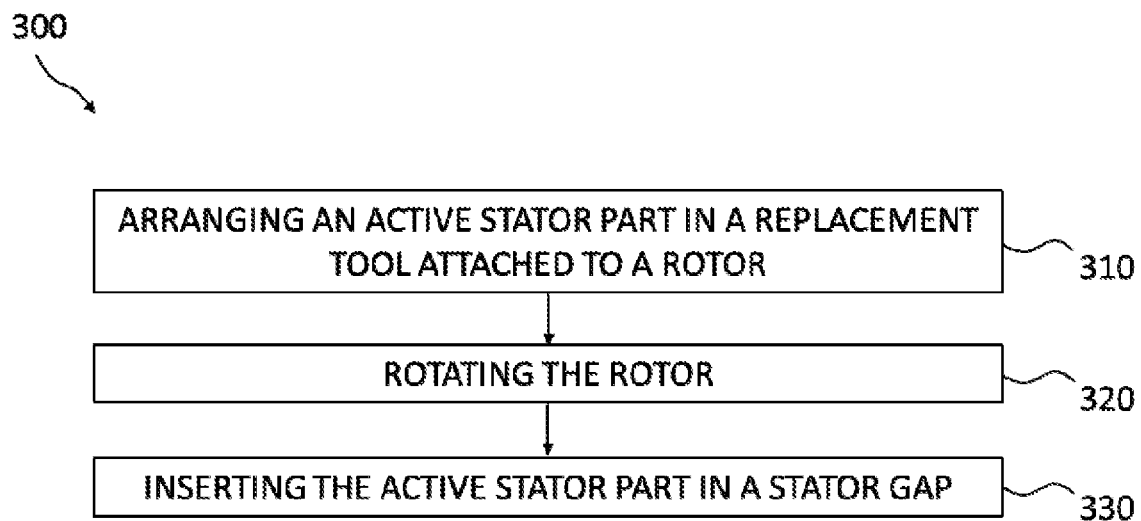
FIG. 10 schematically illustrates a flowchart of an example of a method for mounting an active part of a stator.

In another aspect of the disclosure, a method 300 for mounting an active stator part 122 in a stator 120 of an electrical machine 100 is provided. Method 300 is schematically shown in FIG. 10. An electrical machine 100 may be a generator, more in particular a generator for a wind turbine, and more in particular a generator for a direct drive wind turbine.

Figure 12:
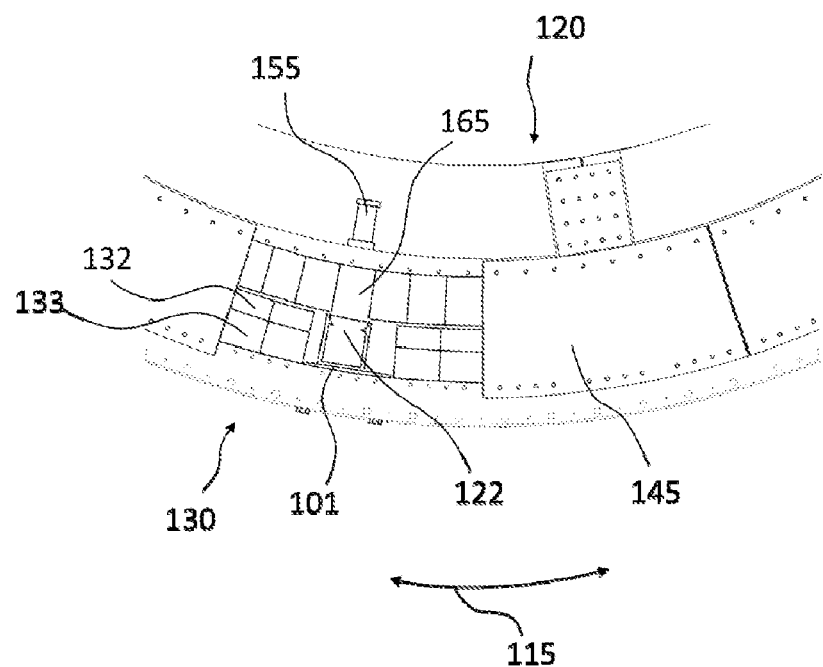

FIG. 12 shows a stator gap 165 in which an active stator part 122 is to be installed.

Figure 11:
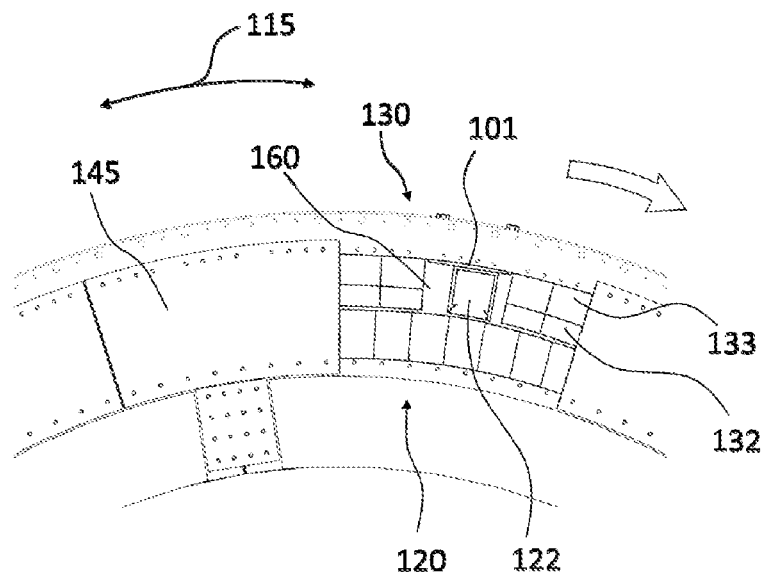
FIGS. 11 and 12 schematically illustrate some aspects of the method of FIG. 10.

The method comprises, at block 310, arranging an active stator part 122 in a replacement tool 101 attached to a rotor 130 while the rotor is in a mounting starting position. This step is illustrated in FIG. 11. The mounting starting position of the rotor may correspond to the extraction position of method 200 or to a different position. An active stator part 122 may be a coil and an active rotor part 132 may be a permanent magnet module in some examples. If method 300 is not performed as a continuation of method 200, one or more active rotor parts 132, and optionally one or more spacers 133, may need to be removed for creating a gap 160 in the rotor for arranging the tool 101. The rotor may be rotated to the mounting starting position, or may be already in the mounting starting position.

The method further comprises, at block 320, rotating the rotor to an insertion position such that the replacement tool 101 is radially aligned with a gap 165 of the stator in which the active stator part 122 is to be mounted. Such a position has been achieved in FIG. 12. The insertion position may be the alignment position of method 200 if these methods are performed one after the other.

The method further comprises, at block 330, inserting the active stator part 122 in the gap 65. In some examples, a movable element 155 may pick the active part 122 from the replacement tool 101 and move it towards the stator rim 121. Movement may be radial 110, in particular in a radially inwards direction (see arrow 114 in FIG. 8).

The movable element 155 may be the same as the one used for the extraction of an active stator part 122 in method 200.

Once in place, the active part of the stator 120 may be attached to the stator rim 121, for example with nuts and bolts.

The method may further comprise rotating the rotor 130 to a mounting ending position and removing the replacement tool 101. The mounting ending position may be the mounting starting position in some examples. The replacement tool 101 may need to be detached from a rotor circumferential cover before removing the tool 101. The tool 101 may be extracted in an axial direction 105 in some examples.

Once the rotor gap 160 between circumferentially adjacent active parts of the rotor 132 has been freed, one or more active rotor parts 132 may be placed in the gap 160 to fill it (see FIG. 4). For example, one or more permanent magnet modules may be attached to the rotor rim 131. Any cover 145 which has been removed to access the active parts 122, 132 may be attached again to the generator (see FIG. 3).

In this way, an active stator part 122 may be conveniently and efficiently replaced.

In another aspect of the disclosure, a replacement tool 101 is provided. The replacement tool is configured to hold an active stator part 122 in an electrical machine. The replacement tool 101 may be used in method 200, in method 300, and in a combination of methods 200 and 300.

Figure 13:
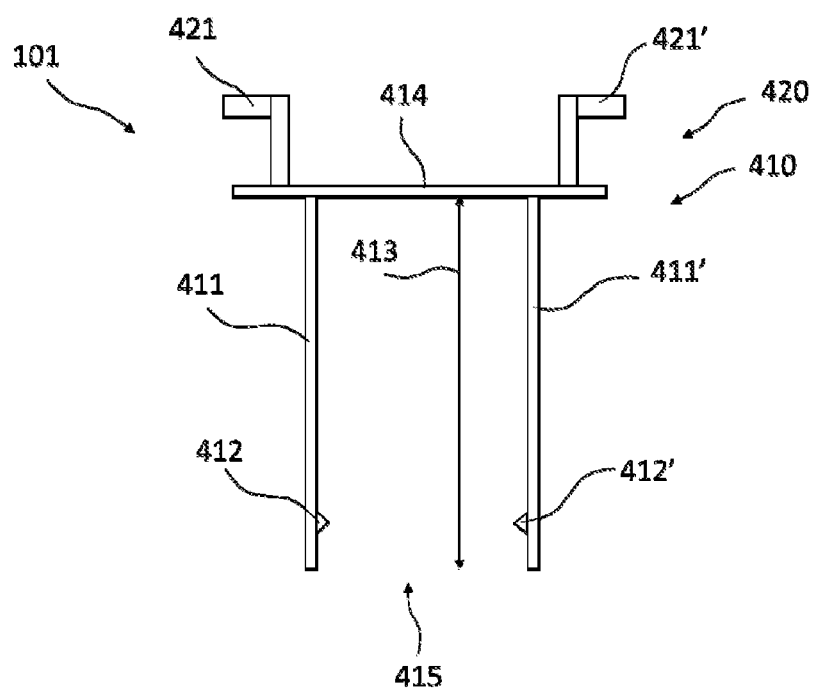
FIG. 13 schematically illustrates an example of a tool for removing and/or mounting an active part from/to a stator.

An example of a replacement tool 101 has been schematically represented in FIG. 13. The replacement tool 101 comprises a holding portion 410 and an anchoring portion 420. The holding portion is configured to hold an active stator part 122. The anchoring portion is configured to secure the replacement tool 101 to a rotor 130, for example to a circumferential cover of the rotor.

The holding portion 410 may comprise two substantially parallel arms 411, 411' extending from the base 414. The parallel arms 411, 411' may be configured to surround an active stator part 122. A height 431 of the arms may be designed to be about the same of a height of an active stator part 122.

In some examples, a height 431 of the arms 411, 411' may be adjustable. For instance, the arms may be telescopic.

The holding portion 410 may comprise two opposite inner protrusions 412, 412' configured to hold or clamp an active stator part 122. For example, each arm 411, 411' may have an inner protrusion 412, 412' to this end. When attached to the rotor 130, the arms may extend in a radial direction 110 and the protrusions may extend in a tangential direction 115.

As illustrated in FIG. 13, the protrusions may be located at or near an end 415 of the replacement tool 101 opposite to the anchoring portion 420. A protrusion 412, 412' may be configured to fit in a recess that an active stator part 122 may have. In some examples, recesses in an active part 122 may only be accessible to the tool 101 after the active part 122 has been radially (outwardly) displaced.

The holding portion 410 may comprise a base 414 from which arms 411, 411' may extend. When picking a active stator part 122, the base 414 may be in contact with an upper (radially outwards) side of the active part 122.

The anchoring portion 420 may have one or more grippers 421, 421' for gripping the rotor 130, e.g. a portion of a circumferential cover of the rotor. A gripper may be a clamp or any suitable component to releasably connect the tool 101 to the rotor. In some examples, grippers may extend from base 414.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for mounting or removing an active stator part of an electrical machine, the method comprising:
   removing one or more active rotor parts of a rotor of the electrical machine when the rotor is in a removal starting position;
   removing one or more spacers radially adjacent to the one or more active rotor parts;
   arranging a replacement tool in a gap created by the removing of the active rotor parts and the one or more spacers;
   rotating the rotor to an alignment position such that the replacement tool is radially aligned with the active stator part to be removed;
   grasping the active stator part to be removed with the replacement tool;
   rotating the rotor to an extraction position; and
   removing the active stator part from the rotor.

2. The method of claim 1, further comprising removing a side cover to enable access to the one or more active rotor parts.

3. The method of claim 1, wherein the one or more active rotor parts or the active stator part are removed in an axial direction.

4. The method of claim 1, further comprising pushing the active stator part to be removed towards the replacement tool with a movable element.

5. The method of claim 4, wherein the movable element is incorporated in the active stator part.

6. The method of claim 1, wherein the active stator part is clamped by the replacement tool.

7. The method of claim 1, wherein the extraction position corresponds to the removal starting position.

8. The method of claim 1, wherein the electrical machine is a generator for a wind turbine.

* * * * *